United States Patent
Siemensmeyer et al.

(10) Patent No.: US 8,193,266 B2
(45) Date of Patent: Jun. 5, 2012

(54) METHOD FOR THE TREATMENT OF SUBSTRATES

(75) Inventors: Karl Siemensmeyer, Frankenthal (DE); Johann Mueller, Worms (DE); Stefan Kuhn, Frankenthal (DE); Karl-Heinz Weigert, Neustadt (DE); Oihana Elizalde, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 272 days.

(21) Appl. No.: 12/446,764

(22) PCT Filed: Oct. 23, 2007

(86) PCT No.: PCT/EP2007/061345
§ 371 (c)(1),
(2), (4) Date: Apr. 23, 2009

(87) PCT Pub. No.: WO2008/049838
PCT Pub. Date: May 2, 2008

(65) Prior Publication Data
US 2010/0062666 A1   Mar. 11, 2010

(30) Foreign Application Priority Data

Oct. 25, 2006  (EP) ..................................... 06122931
May 10, 2007  (EP) ..................................... 07107938

(51) Int. Cl.
B32B 5/02    (2006.01)
C08K 5/06    (2006.01)
B05D 1/36    (2006.01)
C09D 1/00    (2006.01)
C09D 11/02   (2006.01)

(52) U.S. Cl. ..... 524/378; 524/366; 422/59; 106/287.23; 106/287.24; 106/31.6

(58) Field of Classification Search ................... 524/366, 524/378; 442/59; 106/287.23, 287.24, 31.6
See application file for complete search history.

(56) References Cited

U.S. PATENT DOCUMENTS

| | | | |
|---|---|---|---|
| 3,825,431 A | 7/1974 | Uhl et al. | |
| 3,957,712 A | 5/1976 | Heyden et al. | |
| 4,389,213 A | 6/1983 | Schneider et al. | |
| 5,151,128 A * | 9/1992 | Fukushima et al. | 106/31.46 |
| 2002/0121220 A1 * | 9/2002 | Lin | 106/31.27 |
| 2009/0004441 A1 | 1/2009 | Haberle et al. | |
| 2009/0029140 A1 | 1/2009 | Haberle et al. | |

FOREIGN PATENT DOCUMENTS

| | | |
|---|---|---|
| DE | 2 114 609 | 10/1972 |
| DE | 23 43 198 | 3/1975 |
| EP | 0 064 225 | 11/1982 |
| JP | 56147870 A * | 11/1981 |
| JP | 11217528 A * | 8/1999 |
| JP | 2003073956 A * | 3/2003 |
| JP | 2004204070 A * | 7/2004 |
| WO | 2005 012378 | 2/2005 |

OTHER PUBLICATIONS

Machine Translation of JP 11-217528; Wakabayahi et al; Aug. 1999.*
Machine Translation of JP 2004-204070; Kamato et al; Jul. 2004.*
Abstract in English, JP 2003-073956; Mar. 2003.*
Oota et al; JP 56-147870 A; Abstract in English; Nov. 1981.*

* cited by examiner

*Primary Examiner* — Vasudevan S. Jagannathan
*Assistant Examiner* — Mark Kaucher
(74) *Attorney, Agent, or Firm* — Oblon, Spivak, McClelland, Maier & Neustadt, L.L.P.

(57) ABSTRACT

The use of compounds of the general formula I

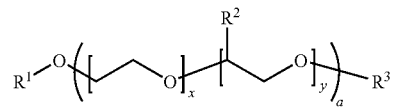

in aqueous binder-containing formulations, wherein the variables are each as defined as follows:

$R^1$ is selected from $C_1$-$C_{20}$-alkyl, straight chain or branched, or CO—$C_1$-$C_{19}$-alkyl or CO—$C_2$-$C_{19}$-alkenyl, straight chain or branched, $R^2$ in each occurrence is the same or different and selected from $C_1$-$C_3$-alkyl, $R^3$ is selected from $C_1$-$C_{20}$-alkyl, straight chain or branched, or CO—$C_1$-$C_{19}$-alkyl or CO—$C_2$-$C_{19}$-alkenyl, straight chain or branched, x is from 0 to 20,
y is from 0 to 20,
provided x and y are not both zero,
a is from 1 to 3.

12 Claims, No Drawings

METHOD FOR THE TREATMENT OF SUBSTRATES

The present invention relates to the use of compounds of the general formula I

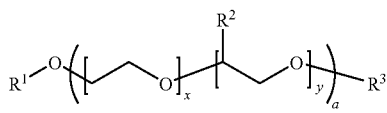

in aqueous binder-containing formulations, wherein the variables are each defined as follows:
$R^1$ is selected from $C_1$-$C_{20}$-alkyl, straight chain or branched, or CO—$C_1$-$C_{19}$-alkyl or CO—$C_2$-$C_{19}$-alkenyl, straight chain or branched,
$R^2$ in each occurrence is the same or different and selected from $C_1$-$C_3$-alkyl,
$R^3$ is selected from $C_1$-$C_{20}$-alkyl, straight chain or branched, or CO—$C_1$-$C_{19}$-alkyl or CO—$C_2$-$C_{19}$-alkenyl, straight chain or branched
x is from 0 to 20,
y is from 0 to 20,
provided x and y are not both zero,
a is from 1 to 3.

The present invention further relates to aqueous binder-containing formulations comprising compounds of the general formula I. The present invention further relates to a process for treating substrates, in particular textile, using aqueous binder-containing formulations of the present invention. The present invention further relates to substrates treated by the process of the present invention.

Numerous treatment methods for substrates such as textile comprise applying aqueous formulations comprising one or more binders. Examples include the printing with print pastes or dyeing liquors, particularly padding liquors in the case of textile, or the coating of textile. Another example is the application of bonders to fibrous nonwoven webs.

Treating substrates, in particular textile, often utilizes aqueous binder-containing formulations. Such aqueous formulations can be for example print pastes when textile is printed. The actual treating step is typically followed by a thermal treatment which can consist of one or more steps and which typically comprises at least one step carried out in a drying cabinet or drying assembly. In many cases, however, it is observed that the treated substrates exhibit spots or stains after the thermal treatment even though they appeared completely free of stains or spots before the thermal treating. These spots or stains often comprise an accumulation of softener. In order that the printed substrates may have a pleasant hand, many aqueous binder-containing formulations have one or more softeners added to them. Softeners of this kind are frequently esters, in particular alkyl esters of dicarboxylic acids such as for example adipic acid or terephthalic acid. The alkyl radicals can be selected from a wide variety of alkyl radicals, straight chain and branched, unsubstituted or substituted. However, it is frequently observed that deposits are formed in at least one drying cabinet or drying assembly, usually in the drying cabinet or drying assembly in which the first (or sole) step of the thermal treatment is carried out, and are shown by closer analysis to be residues of plasticizer or their decomposition products. Accumulations of softeners are also found in the spots and stains on the printed and thermally treated substrates. Such spots and stains are not just esthetically unattractive, but can also reduce fastnesses such as the rubfastnesses for example.

The present invention has for its object to provide aqueous binder-containing formulations for treating substrates which not only have fewer spots or stains but also have a pleasant hand and good fastnesses such as rubfastnesses for example. The present invention further has for its object to provide a process for treating substrates to produce substrates which not only have fewer spots or stains but also have a pleasant hand and good fastnesses such as rubfastnesses for example. The present invention further has for its object to provide a use for certain compounds in aqueous binder-containing formulations. The present invention lastly has for its object to provide treated substrates having properties described above.

We have found that this object is achieved by the use defined at the beginning. The use defined at the beginning concerns compounds of the general formula I

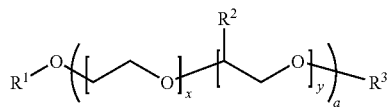

where the variables are each defined as follows:
$R^1$ is selected from $C_1$-$C_{20}$-alkyl, for example $C_1$-$C_{10}$-alkyl, preferably $C_{10}$-$C_{18}$-alkyl, more preferably $C_{13}$-$C_{15}$-alkyl, straight chain or branched, unsubstituted or preferably mono- or polysubstituted with hydroxyl groups or keto groups, for example
for example methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, n-octyl, 2-ethylhexyl, n-nonyl, n-decyl;
preferably n-decyl, iso-decyl, n-undecyl, iso-undecyl, n-dodecyl, iso-dodecyl, n-tridecyl, iso-tridecyl, n-tetradecyl, iso-tetradecyl, triisobutenyl, tetraisobutenyl, n-pentadecyl, iso-pentadecyl, n-hexadecyl, iso-hexadecyl, n-heptadecyl, iso-heptadecyl, n-octadecyl, iso-octadecyl, more preferably $C_{13}$-$C_{15}$-alkyl, for example n-tridecyl, iso-tridecyl, n-tetradecyl, iso-tetradecyl, n-pentadecyl, iso-pentadecyl,
or CO—$C_1$-$C_{19}$-alkyl, preferably CO—$C_{10}$-$C_{19}$-alkyl, straight chain or branched, for example acetyl(CO—$CH_3$), propionyl(CO—$C_2H_5$), n-butyryl(CO-n-$C_3H_7$), iso-butyryl, n-valeroyl(CO-n-$C_4H_9$), CO-n-$C_{10}H_{21}$, preferably CO-n-$C_{11}H_{23}$, CO-iso-$C_{11}H_{23}$, CO-n-$C_{13}H_{27}$, CO-iso-$C_{13}H_{27}$, CO-n-$C_{15}H_{31}$, CO-iso-$C_{15}H_{31}$, CO-n-$C_{17}H_{35}$, CO-iso-$C_{17}H_{35}$, CO-n-$C_{19}H_{39}$, CO-iso-$C_{19}H_{39}$, preference being given to lauryl radicals (CO-n-$C_{11}H_{23}$), myristyl radicals (CO-n-$C_{13}H_{25}$), palmityl (CO-n-$C_{15}H_{31}$) and stearyl radicals (CO-n-$C_{17}H_{34}$),
or CO—$C_2$-$C_{19}$-alkenyl, branched or preferably straight chain, for example (meth)acryl, in particular carboxyl radicals derived from oleic acid (cis-9-octadecenoic acid), linoleic acid (cis,cis-9,12-octadecadienoic acid) or linolenic acid (all-cis-9,12,15-octadecatrienoic acid),
$R^2$ in each occurrence is the same or different and selected from $C_1$-$C_3$-alkyl, for example ethyl, n-propyl, iso-propyl and particularly methyl,
$R^3$ is selected from $C_1$-$C_{20}$-alkyl, for example n-decyl, iso-decyl, n-undecyl, iso-undecyl, n-dodecyl, iso-dodecyl, n-tridecyl, iso-tridecyl, n-tetradecyl, iso-tetradecyl, triisobutenyl, tetraisobutenyl, n-pentadecyl, iso-pentadecyl, n-hexadecyl, iso-hexadecyl, n-heptadecyl, iso-heptadecyl, n-octadecyl, iso-octadecyl, n-eicosyl, preferably from $C_1$-$C_8$-alkyl, branched or preferably straight chain, for example methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, n-octyl, 2-ethylhexyl, more preferably $C_1$-$C_4$-alkyl such as methyl, ethyl, n-propyl, iso-propyl, n-butyl, iso-butyl, sec-butyl and tert-butyl, more preferably ethyl and even more preferably methyl, or CO—$C_1$-$C_{19}$-alkyl, straight chain or branched, for example CO—$CH_3$ (acetyl), CO—$C_2H_5$ (propionyl), CO-n-$C_3H_7$ (butyryl), CO-iso-$C_3H_7$ (iso-butyryl), CO-n-$C_5H_{11}$ (valeroyl), CO-iso-$C_5H_{11}$ (iso-valeroyl), or stearoyl, or CO—$C_2$-$C_{19}$-alkenyl, branched or preferably straight chain, for example (meth)acryl, in particular carboxyl radicals derived from oleic acid (cis-9-octadecenoic acid), linoleic acid (cis,cis-9,12-octadecadienoic acid) or linolenic acid (all-cis-9,12,15-octadecatrienoic acid), x is from 0 to 20 and preferably from 3 to 10,
y is from 0 to 20, preferably from 1 to 10 and more preferably up to five,
provided x and y are not both zero,
a is from 1 to 3, preferably an integer from 1 to 3 and more preferably 1.
$R^1$ and $R^3$ may each be the same or different.

In a preferred embodiment of the present invention, $R^3$ is selected from CO—$C_1$-$C_{19}$-alkyl when $R^1$ is selected from CO—$C_1$-$C_{19}$-alkyl or CO—$C_2$-$C_{19}$-alkenyl.

In another preferred version of the present invention $R^3$ is selected from $C_1$-$C_{20}$-alkyl and particularly $C_1$-$C_8$-alkyl when $R^1$ is selected from CO—$C_1$-$C_{19}$-alkyl or CO—$C_2$-$C_{19}$-alkenyl.

One embodiment of the present invention comprises selecting the variables in compounds of the general formula I as follows:
$R^1$ selected from $C_{10}$-$C_{18}$-alkyl, straight chain or branched,
$R^2$ in each occurrence the same or different and selected from $C_1$-$C_3$-alkyl,
$R^3$ selected from $C_1$-$C_8$-alkyl, straight chain or branched,
x from 3 to 20,
y from 1 to 20,
a from 1 to 3.

The manufacture of compounds of the general formula I is known per se and is accomplished for example by a multistage process comprising initially an alcohol (or a mixture of alcohols) of the formula $R^1$—OH being ethoxylated, for example with the aid of an acidic or basic catalyst, then reacted with a compound of the general formula II,

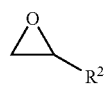

II where $R^2$ is as defined above, and finally etherified with an alcohol of the formula $R^3$—OH or reacted with some other alkylating agent capable of transferring $R^3$ radicals.

In another embodiment of the present invention, the manufacture of compounds of the general formula I is accomplished by a multistage process comprising initially a fatty acid (or a mixture of fatty acids) of the formula $R^1$—OH (where $R^1$ is selected from CO—$C_1$-$C_{19}$-alkyl or CO—$C_2$-$C_{19}$-alkenyl), or a suitable derivative, for example the corresponding methyl or ethyl ester, being ethoxylated, for example with the aid of an acidic or basic catalyst, then reacted with a compound of the general formula II, and finally esterified with a carboxylic acid of the formula $R^3$—OH ($R^3$ selected from CO—$C_1$-$C_{19}$-alkyl) or reacted with some other acylating agent capable of transferring $R^3$ radicals.

In another embodiment of the present invention, the manufacture of compounds of the general formula I is accomplished by a carboxylic acid of the general formula $R^1$—OH ($R^1$ selected from CO—$C_1$-$C_{19}$-alkyl or CO—$C_2$-$C_{19}$-alkenyl) or a suitable derivative, for example the corresponding methyl or ethyl ester, being reacted with a singly capped polyalkylene oxide of the formula HO($CH_2CH_2O$)$_x$ ($CHR^2CH_2O$)$_y$—$R^3$, where $R^3$ is selected from $C_1$-$C_{20}$-alkyl and particularly $C_1$-$C_8$-alkyl.

The nature of their manufacturing operation is such that compounds of the general formula I are typically generated as mixtures, so that—based on the mixture—x and y as average values may each also have the value of a non-integral number, whereas x and y for the individual compound do of course have the value of an integral number. For the purposes of the present invention, a compound of the general formula I is each and every time to be understood as meaning the mixture which is used according to the present invention.

One embodiment of the present invention selects aqueous binder-containing formulations from dyeing liquors, coating compositions, fibrous nonwoven web bonders and in particular from print pastes, for example for textile printing.

Dyeing liquors, in particular for padding, shall herein be understood as referring to aqueous binder-containing formulations comprising at least one pigment and applied for example by padding to substrates, in particular to a textile, and thereafter thermally treated.

Dyeing liquors for the purposes of the present invention may comprise one or more additions, for example wetting agents, deaerators, antimigration agents, hand improvers and crosslinkers.

Useful wetting agents, which may also act as emulsifiers, include for example nonionic, anionic or cationic surfactants, in particular ethoxylation and/or propoxylation products of fatty alcohols or propylene oxide-ethylene oxide block copolymers, also ethoxylates of oleic acid or alkylphenols, alkylphenol ether sulfates, alkylpolyglycosides, alkyl phosphonates, alkylphenyl phosphonates, alkyl phosphates or alkylphenyl phosphates.

Dry textile wovens, yarns, filaments, knits or fibrous nonwoven webs as used in continuous pigment dyeing contain a large amount of air. Therefore the use of deaerators is advantageous. Deaerators are based for example on polyether siloxane copolymers. They can be present in amounts of 0.01 to 2 g/l in the dyeing liquors of the present invention.

Dyeing liquors may further comprise antimigration agents. Useful antimigration agents include for example block copolymers of ethylene oxide and propylene oxide having molecular weights $M_n$ in the range from 500 to 5000 g/mol and are preferably in the range from 800 to 2000 g/mol.

Dyeing liquors may further include one or more added hand improvers. Hand improvers generally comprise polysiloxanes or waxes. Polysiloxanes have the advantage here of durability, whereas waxes are gradually washed off during use.

Dyeing liquors of the present invention may comprise one or more crosslinkers, for example condensation products of at least one amino-containing compound and at least one aldehyde or dialdehyde and optionally at least one alcohol, in particular N,N'-dimethylol-4,5-dihydroxyethyleneurea (DMDHEU) and also etherification products of DMDHEU with one or more equivalents of $C_1$-$C_4$-alkanol or with one or more equivalents of ethylene glycol, diethylene glycol, triethylene glycol or polyethylene glycol, dimers of DMDHEU, DMeDHEU. Further suitable crosslinkers are triisocyanurates based on aliphatic diisocyanates, in particular the triisocyanurate of hexamethylene diisocyanate (HDI) and also triisocyanurates hydrophilicized with for example mono-, C1-C4-alkyl ethers of di-, tri- or polyethylene glycol, in particular of aliphatic diisocyanates such as HDI.

Dyeing liquors of the present invention typically have a weakly acidic pH, preferably in the range from 4 to 6.5, or a weakly alkaline pH, for example in the range from 7.1 to 9.5, set with ammonia for example. The viscosities of dyeing liquors according to the present invention are preferably in the range of below 100 mPa·s. Surface tensions of dyeing liquors are to be adjusted such that wetting of the goods is possible. Surface tensions of less than 50 mN/m at 23° C. are useful for example.

In one embodiment of the present invention, a typical dyeing liquor according to the present invention comprises per liter 0 to 500 g, preferably 10 to 200 g of binder,
0 to 100 g, preferably 0.1 to 10 g of wetting agent,
0 to 100 g, preferably 0.1 to 10 g of defoamer,
0 to 100 g, preferably 1 to 50 g of antimigration agent,
0 to 100 g, preferably 1 to 50 g of leveling agent,
0.005 to 25 g, preferably 0.01 to 12 g of pigment,
0.5 to 20 g, preferably up to 15 g, more preferably 1 to 10 g of compound of the general formula I.

Coating compositions for the purposes of the present invention serve the durable application of materials, preferably synthetic or natural organic polymers, to preferably textile substrate, see for example Substrat- und Textilbeschichtung, Praxiswissen für Textil-, Bekleidungs- und Beschichtungsbetriebe, Andreas Giessmann, Springer-Verlag Berlin Heidelberg 2003. Depending on the configuration of the process, the material, preferably the synthetic or natural organic polymer or polymers, can be applied, formulated as a paste, dispersion, emulsion, plastisol, organisol or melt, to preferably textile substrate. An applicator system is used, examples being pad mangle, knife over roll coater, floating knife coater, rubber blanket coater, supported knife coater, tabletop knife coater, wire wound knife coater, box section knife coater, comma bar, reverse roll coater, contra coater, roll coater and direct gravure print coater, kiss coater, rotary screen printing, powder coating, spraying, dipping and impregnating, dot and double dot coating, foam coating. The purpose of a coating or lamination can be aesthetic or functional reasons.

Finishing processes for the purposes of the present invention form part of the textile processing operations designed to convert substrates, for example pretreated (bleached), dyed or printed substrates, into a saleable and end-itemable state. There are mechanical, nondurable and laundry-durable finishing processes where woven or knit fabric, usually in the form of a continuous sheet, is subjected to continuous treatment. The most important part is chemical finishing, also known as resin finishing or easy care finishing. Resin or easy care finishing includes for example no-iron, crease resist, shrinkage resist, easy care and wash and wear finishing. Resin or easy care finishing utilizes chemicals which react with themselves and, for example, crosslink cellulose molecules at least partially. Examples of resin or easy care finishing chemicals are N,N'-dimethylol-4,5-dihydroxyethyleneurea ("DMDHEU") and also etherification products of DMDHEU with one or more equivalents of $C_1$-$C_4$-alkanol or with one or more equivalents of ethylene glycol, diethylene glycol, triethylene glycol or polyethylene glycol, dimers of DMDHEU, DMeDHEU.

To conduct a foam coating, coating compositions have at least one foaming agent added to them. Particularly suitable foaming agents are mixtures of ammonium stearate+1,3-bis(2,6-dimethylphenoxy)-2-propanol×18 ethylene oxide, for example in a mixing ratio of 1:1 (by weight).

Print pastes in the realm of the present invention are preferably aqueous preparations having a viscous consistency. The dynamic viscosity of print pastes used according to the present invention at 20° C. can be for example in the range from 50 to 150 dPa·s, preferably in the range from 60 to 100 dPa·s and in another embodiment in the range from 10 to 55 dPa·s, determined according to DIN iso 2555 for example.

Print pastes for the purposes of the present invention may comprise one or more colorants, preferably one or more pigments.

Pigments for the purposes of the present invention are substantially insoluble, dispersed, finely divided, organic or inorganic colorants as per the definition in German Standard Specification DIN 55944. Suitable pigments can be inorganic pigments. Further suitable pigments are selected from carbon black, which can be modified or nonmodified.

Illustratively selected inorganic pigments are zinc oxide, zinc sulfide, lithopone, lead white, lead sulfate, chalk, titanium dioxide; iron oxide yellow, cadmium yellow, nickel titanium yellow, chromium titanium yellow, chromium yellow, lead chromate, bismuth vanadate, Naples yellow or zinc yellow ultramarine blue, cobalt blue, manganese blue, iron blue,
ultramarine green, cobalt green, chromium oxide (chromium oxide green);
ultramarine violet, cobalt violet, manganese violet;
ultramarine red, molybdate red, chromium red, cadmium red;
iron oxide brown, chromium iron brown, zinc iron brown, manganese titanium brown;
iron oxide black, iron-manganese black, spinel black, carbon black;
orange spinels and corandums, cadmium orange, chromium orange, lead molybdate;
aluminum or Cu/Zn alloy.

Preference is given to carbon black, iron oxide pigments such as for example iron oxide yellow, iron oxide brown and iron oxide black, zinc oxide and titanium oxide.

Pigments are preferably selected from organic pigments or metal pigments.

Illustratively selected organic pigments are
monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;
disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;
anthanthrone pigments: C.I. Pigment Red 168 (C.I. Vat Orange 3);
anthraquinone pigments: C.I. Pigment Yellow 147 and 177; C.I. Pigment Violet 31;
anthraquinone pigments: C.I. Pigment Yellow 147 and 177; C.I. Pigment Violet 31;
anthrapyrimidine pigments: C.I. Pigment Yellow 108 (C.I. Vat Yellow 20);
quinacridone pigments: C.I. Pigment Red 122, 202 and 206; C.I. Pigment Violet 19;

quinophthalone pigments: C.I. Pigment Yellow 138;
dioxazine pigments: C.I. Pigment Violet 23 and 37;
flavanthrone pigments: C.I. Pigment Yellow 24 (C.I. Vat Yellow 1);
indanthrone pigments: C.I. Pigment Blue 60 (C.I. Vat Blue 4) and 64 (C.I. Vat Blue 6);
isoindoline pigments: C.I. Pigment Orange 69; C.I. Pigment Red 260; C.I. Pigment Yellow 139 and 185;
isoindolinone pigments: C.I. Pigment Orange 61; C.I. Pigment Red 257 and 260; C.I. Pigment Yellow 109, 110, 173 and 185;
isoviolanthrone pigments: C.I. Pigment Violet 31 (C.I. Vat Violet 1);
metal complex pigments: C.I. Pigment Yellow 117, 150 and 153; C.I. Pigment Green 8;
perinone pigments: C.I. Pigment Orange 43 (C.I. Vat Orange 7); C.I. Pigment Red 194 (C.I. Vat Red 15);
perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;
phthalocyanine pigments: C.I. Pigment Blue 15, 15:1, 15:2, 15:3, 15:4, 15:6 and 16; C.I. Pigment Green 7 and 36;
pyranthrone pigments: C.I. Pigment Orange 51; C.I. Pigment Red 216 (C.I. Vat Orange 4);
thioindigo pigments: C.I. Pigment Red 88 and 181 (C.I. Vat Red 1); C.I. Pigment Violet 38 (C.I. Vat Violet 3);
triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black); C.I. Pigment Yellow 101 (aldazine yellow), C.I. Pigment Brown 22.

Examples of particularly preferred pigments are: C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43 and C.I. Pigment Green 7.

Further suitable pigments are metallic pigments such as for example gold bronze, silver bronze, Iriodin pigments, mica.

The average diameter of pigments in print pastes is typically in the range from 20 nm to 1.5 μm and preferably in the range from 100 to 300 nm.

In one embodiment of the present invention, pigment is present in spherical or substantially spherical particulate form, i.e., the ratio of the longest diameter to the smallest diameter is in the range from 1.0 to 2.0, preferably up to 1.5.

Pigments are preferably added to print pastes for the purposes of the present invention in the form of pigment preparations. Pigment preparations comprise typically 20% to 60% by weight of pigment, water and one or more surface-active compounds, for example one or more emulsifiers, for example multiply alkoxylated $C_{10}$-$C_{30}$-alkanols.

Print pastes for the purposes of the present invention may further comprise at least one thickener (also called thickening agent), with aqueous thickeners being preferred. Natural or synthetic thickeners can be used. Preference is given to the use of synthetic thickeners, for example of generally liquid solutions of synthetic polymers in for example white oil or as aqueous solutions. The synthetic polymers comprise acid groups which are neutralized with ammonia fully or up to a certain percentage. Ammonia is released in the course of the fixing operation, lowering the pH and starting the actual fixation. The lowering of the pH needed for fixation can alternatively be effected by adding nonvolatile acids such as for example citric acid, succinic acid, glutaric acid or malic acid. Also suitable are hydrogenphosphates and dihydrogenphosphates, for example diammonium hydrogenphosphate.

Print pastes for the purposes of the present invention may comprise 20% to 40% by weight of white oil in particular.

Aqueous thickeners typically comprise up to 25% by weight of polymer. To use aqueous formulations of a thickener it is generally customary to add aqueous ammonia. Similarly, the use of granular, solid formulations of a thickener is conceivable to be able to produce pigment prints emissionlessly.

Examples of particularly preferred synthetic thickeners are copolymers comprising 85% to 95% by weight of acrylic acid, 4% to 14% by weight of acrylamide and 0.01% to not more than 1% by weight of the (meth)acrylamide derivative of the formula III

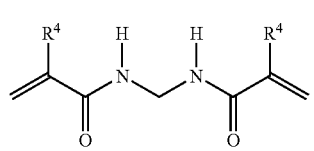

having molecular weights $M_w$ in the range from 100 000 to 2 000 000 g/mol, in each of which $R^4$ is selected from methyl and particularly hydrogen.

Binders for the purposes of the present invention are emulsified or dispersed film-forming polymers including copolymers. Useful binders include not only dispersions, emulsions but also organisols of (co)polymers such as for example polyacrylates, polyurethanes, polybutadiene, polyolefins such as polyethylene or polypropylene and copolymers thereof. Preference is given to dispersions or emulsions of polyacrylates or polyurethanes.

Suitable polyacrylates, preferred binders for the purposes of the present invention, are such copolymers, in particular emulsion copolymers of at least one monoethylenically unsaturated carboxylic acid or dicarboxylic acid such as for example maleic acid, fumaric acid, crotonic acid, itaconic acid or preferably (meth)acrylic acid with at least one comonomer such as for example at least one $C_1$-$C_{10}$-alkyl ester of at least one monoethylenically unsaturated carboxylic acid or dicarboxylic acid, particularly methyl (meth)acrylate, ethyl acrylate, n-butyl acrylate and 2-ethylhexyl acrylate, and/or at least one further comonomer selected from for example vinylaromatics, for example para-methylstyrene, α-methylstyrene and particularly styrene, and nitrogenous comonomers such as (meth)acrylamide, (meth)acrylonitrile.

In one embodiment of the present invention, polyacrylates, which are useful as binders comprise at least one reactive comonomer selected from glycidyl(meth)acrylate, acetoacetyl(meth)acrylate and N-methylol(meth)acrylamide in interpolymerized form.

Suitable polyurethanes, preferred binders for the purposes of the present invention, are hydroxyl-terminated polyurethanes obtainable by reaction of at least one polyesterol, for example a condensation product of an aliphatic dicarboxylic acid such as succinic acid, glutaric acid and particularly adipic acid with at least one aliphatic diol, for example 1,6-hexanediol, 1,4-butanediol, neopentylglycol, ethylene glycol or diethylene glycol, and a diisocyanate or polyisocyanate and if appropriate further reactants. Suitable diisocyanates are aliphatic, cycloaliphatic and aromatic diisocyanates, in particular hexamethylene diisocyanate (HDI), dodecamethylene diisocyanate, 4,4'-diisocyanatocylohexylmethane (MDI), cyclohexane 1,4-diisocyanate, isophorone diisocyanate (IPDI) and aromatic diisocyanates such as for example toluylene diisocyanate (TDI).

Examples of further reactants are diols, in particular 1,4-butanediol, and acid-functional molecules, in particular acid-functional diols and acid-functional diamines, for example 3,3-dihydroxymethylolpropionic acid and the compound of the formula VII.

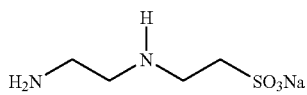

VII

Compounds of the general formula I are usable according to the present invention in aqueous binder-containing formulations with which any desired substrates can be treated, preferably coated and particularly printed, for example wood, paper, polymeric films, for example polyethylene or polyester, also leather, artificial leather, paperboard and cardboard.

In one preferred embodiment of the present invention, aqueous binder-containing formulations comprise print pastes and particularly print pastes for textile printing.

Textile substrates for the purposes of the present invention are textile fibers, textile intermediate and end products and finished articles manufactured therefrom which, as well as textiles for the apparel industry, also comprise for example carpets and other home textiles and also textile constructions for industrial purposes. These include unshaped constructions such as for example staples, linear constructions such as twine, filaments, yarns, lines, strings, laces, braids, cordage and also three-dimensional constructions such as for example felts, wovens, nonwovens and waddings. Textiles can be of natural origin, for example cotton, wool or flax, or synthetic, for example polyamide, polyester, modified polyester, polyester blend fabric, polyamide blend fabric, polyacrylonitrile, triacetate, acetate, polycarbonate, polypropylene, polyvinyl chloride, polyester microfibers and glass fiber fabric. Textile for the purposes of the present invention preferably comprises sheetlike textile.

In one embodiment of the present invention, print pastes comprise at least one nonionic surfactant. Customary nonionic surfactants are for example ethoxylated mono-, di- and tri-$C_4$-$C_{12}$-alkylphenols (degree of ethoxylation: 3 to 50) and also ethoxylated $C_8$-$C_{36}$ fatty alcohols (degree of ethoxylation: 3 to 80). Customary nonionic surfactants are commercially available for example as Lutensol® brands from BASF Aktiengesellschaft.

In one embodiment of the present invention, aqueous binder-containing formulations are free of alkyl esters of dicarboxylic acids, in particular of di-$C_1$-$C_{20}$-alkyl esters of aliphatic, cycloaliphatic or aromatic dicarboxylic acids. Aliphatic, cycloaliphatic and aromatic dicarboxylic acids for the purposes of the present invention are for example adipic acid, 1,4-cyclohexane dicarboxylic acid and terephthalic acid. Dicarboxylic acids shall also comprise polycarboxylic acids such as mellitic acid for example. Alkyl esters of dicarboxylic acids shall in the realm of the present invention also subsume low molecular weight polyesters obtainable by polycondensation of aliphatic dicarboxylic acid and aliphatic diol, for example adipic acid or succinic acid and 1,2-propanediol, preferably having an $M_w$ of 200 to 5000 g/mol.

By "free of alkyl esters of dicarboxylic acids" is meant that the aqueous binder-containing formulations in question comprise less than 0.5% by weight of alkyl ester of dicarboxylic acid, preferably less than 0.1% by weight and more preferably less than 0.05% by weight, for example 10 weight ppm to 100 weight ppm.

Using as described above one or more compounds of the general formula I in aqueous binder-containing formulations generally provides very storage-stable formulations with which substrates can be treated very efficiently and, in particular, textile can be printed spot or stainlessly.

The present invention further provides aqueous binder-containing formulations, preferably print pastes, comprising one or more compounds of the general formula I

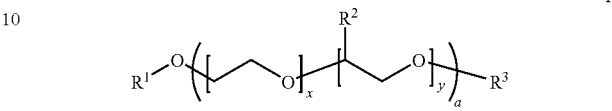

I where the variables are each defined as follows:
$R^1$ is selected from $C_1$-$C_{20}$-alkyl, preferably $C_{10}$-$C_{18}$-alkyl, more preferably $C_{13}$-$C_{15}$-alkyl, straight chain or branched, or CO—$C_1$-$C_{19}$-alkyl or CO—$C_2$-$C_{19}$-alkenyl, straight chain or branched,
$R^2$ in each occurrence is the same or different and selected from $C_1$-$C_3$-alkyl, in particular methyl,
$R^3$ is selected from $C_1$-$C_{20}$-alkyl, preferably $C_1$-$C_8$-alkyl, straight chain or branched, preferably $C_1$-$C_4$-alkyl, more preferably ethyl and most preferably methyl, or CO—$C_1$-$C_{19}$-alkyl or CO—$C_2$-$C_{19}$-alkenyl, straight chain or branched,
x is from 0 to 20, preferably from 3 to 10,
y is from 0 to 20, preferably up to 10 and more preferably up to five,
provided x and y are not both zero,
a is from 1 to 3, preferably an integer in the range from 1 to 3 and more preferably 1.

The variables are subject to the above remarks.

In one embodiment of the present invention, the variables in compounds of the general formula I are each selected as follows:
$R^1$ is selected from $C_{10}$-$C_{18}$-alkyl, straight chain or branched,
$R^2$ in each occurrence is the same or different and selected from $C_1$-$C_3$-alkyl,
$R^3$ is selected from $C_1$-$C_8$-alkyl, straight chain or branched,
x is from 3 to 20,
y is from 1 to 20,
a is from 1 to 3.

Numerous embodiments of aqueous binder-containing formulations according to the present invention are described above.

Print pastes according to the present invention are preferably aqueous preparations having a viscous consistency. The dynamic viscosity of print pastes used according to the present invention at 20° C. can be for example in the range from 50 to 150 dPa·s, preferably in the range from 60 to 100 dPa·s and in another embodiment in the range from 10 to 55 dPa·s, determined according to DIN iso 2555 for example.

Aqueous binder-containing formulations, in particular coating compositions of print pastes, according to the present invention may comprise one or more thickeners (thickening agents). Examples of suitable thickening agents are mentioned above. Further examples of suitable thickening agents are water-soluble polymers of ethylenically unsaturated monomers as described in WO 05/12378.

In one embodiment of the present invention, aqueous binder-containing formulations, in particular dyeing liquors or print pastes, according to the present invention comprise one or more colorants, in particular one or more pigments, pigments being as defined above.

In one embodiment of the present invention, aqueous binder-containing formulations, in particular print pastes, according to the present invention comprise one or more nonionic surfactants. Examples of suitable nonionic surfactants are mentioned above.

In one embodiment of the present invention, aqueous binder-containing formulations according to the present invention and particularly print pastes according to the present invention are free of alkyl esters of dicarboxylic acids, the expression "free of alkyl esters of dicarboxylic acids" being illustrated above.

Aqueous binder-containing formulations according to the present invention, in particular print pastes according to the present invention may in addition to above-mentioned constituents comprise one or more additions, for example fastness improvers, hand improvers, defoamers, wetting agents, leveling agents, water softeners such as for example complexing agents, fixatives (fixing agents), emulsifiers, water-retaining agents such as for example glycerol or urea, actives such as for example biocides or flame retardants.

Suitable fastness improvers are for example room temperature liquid silicone oils and polysiloxanes. In one preferred version of the present invention the use of fastness improvers is redundant.

Suitable defoamers are for example silicone-containing defoamers such as for example those of the formula HO—$(CH_2)_3$—$Si(CH_3)[OSi(CH_3)_3]_2$, nonalkoxylated or alkoxylated with up to 20 equivalents of alkylene oxide and particularly ethylene oxide. Silicone-free defoamers are also suitable, examples being multiply alkoxylated alcohols, for example fatty alcohol alkoxylates, preferably 2- to 50-tuply ethoxylated, preferably unbranched $C_{10}$-$C_{20}$-alkanols, unbranched $C_{10}$-$C_{20}$-alkanols and 2-ethylhexan-1-ol. Further suitable defoamers are fatty acid $C_8$-$C_{20}$-alkyl esters, preferably $C_{10}$-$C_{20}$-alkyl stearates in each of which $C_8$-$C_{20}$-alkyl, preferably $C_{10}$-$C_{20}$-alkyl can be unbranched or branched.

Suitable wetting agents are for example nonionic, anionic or cationic surfactants, in particular ethoxylation and/or propoxylation products of fatty alcohols of propylene oxide-ethylene oxide block copolymers, ethoxylated or propoxylated fatty or oxo process alcohols, also ethoxylates of oleic acid or alkylphenols, alkylphenol ether sulfates, alkylpolyglycosides, alkyl phosphonates, alkylphenyl phosphonates, alkyl phosphates or alkylphenyl phosphates.

Suitable leveling agents are for example block copolymers of ethylene oxide and propylene oxide with molecular weights $M_n$ in the range from 500 to 5000 g/mol, preferably 800 to 2000 g/mol. Very particular preference is given to block copolymers of propylene oxide/ethylene oxide for example of the formula $EO_8PO_7EO_8$, where EO is ethylene oxide and PO is propylene oxide.

Suitable complexing agents are for example the tetrasodium salt of the ethylenediamine tetraacetic acid and the trisodium salt of nitrilotriacetic acid, also phosphonates, phosphates and polyphosphates of alkali metals.

Examples of suitable fixatives are melamine derivatives, which can be alkoxylated, alkoxyalkylated or hemiaminalized, hydrophilicized isocyanurates, polyglycidyl ethers having 2 to 5 glycidyl groups per molecule, carbodiimides, urea or urea derivatives which may if appropriate have been aminalized or hemiaminalized.

Very particularly preferred fixatives are carbodiimides, in particular polymeric carbodiimides. Examples of polymeric carbodiimides are obtainable by condensation or polycondensation of at least one aromatic diisocyanate, for example 2,4-tolylene diisocyanate, 4,4'-diphenylmethane diisocyanate or 1,7-naphthylene diisocyanate or at least one aliphatic or cycloaliphatic carbodiimide such as for example isophorone diisocyanate, trimethylene diisocyanate, tetramethylene diisocyanate, hexamethylene diisocyanate, dodecamethylene diisocyanate, cyclohexane 1,4-diisocyanate, 2,4-hexahydrotolylene diisocyanate, 2,6-hexahydrotoluoylene diisocyanate and 4,4'-dicyclohexylmethane diisocyanate.

Preferred polymeric carbodiimides are copolycarbodiimides obtainable by condensation or polycondensation of at least one aromatic diisocyanate, for example 2,4-tolylene diisocyanate, 4,4'-diphenylmethane diisocyanate or 1,7-naphthylene diisocyanate with at least one aliphatic or cycloaliphatic carbodiimide such as for example isophorone diisocyanate, trimethylene diisocyanate, tetramethylene diisocyanate, hexamethylene diisocyanate, dodecamethylene diisocyanate, cyclohexane 1,4-diisocyanate, 2,4-hexahydrotolylene diisocyanate, 2,6-hexahydrotolylene diisocyanate and 4,4'-dicyclohexylmethane diisocyanate.

Very particular preference is given to polymeric carbodiimides obtainable by polycondensation of m-TMXDI or p-TMXDI

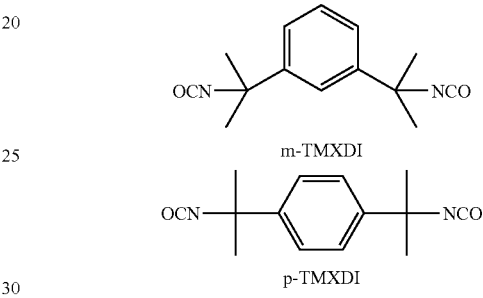

or mixtures of m-TMXDI and p-TMXDI having 2 to 20, preferably up to 15 and more preferably up to 10 N=C=N— groups per mole.

The aforementioned polymeric carbodiimides are particularly effective in combination with one or more diols, for example ethylene glycol, diethylene glycol, triethylene glycol, tetraethylene glycol, 1,3-propanediol, 1,4-butanediol, propylene glycol, dipropylene glycol, tripropylene glycol, tetrapropylene glycol, butylene glycol, 1,6-hexanediol, 1,5-pentanediol, polyethylene glycol having an average molecular weight $M_n$ in the range from 200 to 5 000 g/mol, polypropylene glycol having an average molecular weight $M_n$, in the range from 200 to 5 000 g/mol, polytetrahydrofuran having a molecular weight $M_n$ in the range from 200 to 5 000 g/mol, ethylene oxide-propylene oxide copolymers, in particular block copolymers of ethylene oxide and propylene oxide.

Also suitable are aromatic diols such as for example resorcinol, hydroquinone, 4,4'-biphenyldiol, hydroquinone di-(para-hydroxybenzoate), bisphenol A and also alkoxylation products, particularly ethoxylation products and propoxylation products of the aforementioned aromatic diols, examples being compounds of the general formula IV

IV where the variables are each defined as follows:
A is a divalent organic radical having one to 40 carbon atoms, preferably 2 to 30 carbon atoms, preferably an organic diol, in particular an organic radical having at least one, preferably at least two phenyl rings, which may be substituted, for example para-O—C$_6$H$_4$—O—, para,para'-O—C$_6$H$_4$—C$_6$H$_4$—O—, para,para'-O—C$_6$H$_4$—C(CH$_3$)$_2$—C$_6$H$_4$—O—, AO is selected from C$_2$-C$_4$-alkylene oxide, for example butylene oxide, particularly ethylene oxide CH$_2$CH$_2$O ("EO") and propylene oxide CH$_2$C(CH$_3$)O ("PO")

n in each occurrence is different or preferably the same and selected from numbers in the range from nought to 50, preferably 2 to 20 and more preferably 3 to 15.

Preference is given to compounds of the formula V

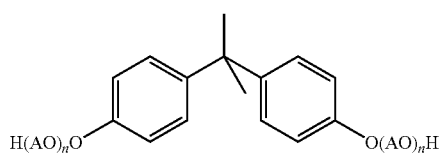

V

Print pastes according to the present invention may comprise one or more emulsifiers. Suitable emulsifiers are preferably nonionic. Examples of nonionic emulsifiers are for example singly or multiply alkoxylated, preferably propoxylated and, in particular, multiply, for example 3 to 100 tuply, ethoxylated fatty alcohols, oxo process alcohols and particularly aryl polyglycol ethers, for example the formula VI a to VI c:

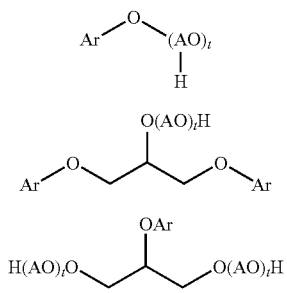

VIa

VIb

VIc where the variables are each defined as follows:

Ar: in each occurrence is different or if appropriate the same, C$_6$-C$_{14}$-aryl, for example phenyl, naphthyl or phenanthryl, unsubstituted or mono- or polysubstituted, in particular with C$_1$-C$_4$-alkyl, branched or unbranched, for example methyl, ethyl, n-propyl, isopropyl, n-butyl, isobutyl or with alkylaryl, for example styryl; preferred substituted phenyl radicals are each 2,6 or 2,4,6 substituted with C$_1$-C$_4$-alkyl.

t in each occurrence is different or preferably the same and selected from numbers in the range from 1 to 100, preferably 2 to 50 and more preferably 3 to 20.

In one embodiment of the present invention, aqueous binder-containing formulations according to the present invention, in particular print pastes according to the present invention, comprise 0.01% to 7% by weight, preferably 0.11% to 4% by weight and more preferably 0.5% to 2% by weight of compound of the general formula I.

In one specific embodiment of the present invention, print pastes according to the present invention comprise 0.01% to 7% by weight, preferably 0.11% to 4% by weight and more preferably 0.5% to 2% by weight of compound of the general formula I, 0.0001% to 15% by weight of pigment, up to 10% by weight and preferably 0.001% to 8% by weight of thickening agent, 1% to 30% by weight and preferably 2% to 20% by weight of binder and altogether 0.1% to 6% by weight and preferably 0.5% to 3% by weight of further additions, the weight % ages all being based on the entire print paste according to the present invention. The balance is preferably water.

In one embodiment of the present invention, aqueous binder-containing formulations according to the present invention, in particular print pastes according to the present invention have a solids content in the range from 3% to 20.5% by weight and preferably in the range from 5% to 15% by weight.

In one embodiment of the present invention, aqueous binder-containing formulations according to the present invention, in particular print pastes according to the present invention have a pH in the range from 7 to 11 and preferably up to 9.

Print pastes according to the present invention are useful for printing a wide variety of substrates, examples being wood, paper, polymeric films, composed of polyethylene or polyester for example, leather, artificial leather, paperboard and cardboards.

In one preferred embodiment of the present invention, print pastes according to the present invention comprise print pastes for textile printing. The term textile is defined above. Textile for the purposes of the present invention preferably comprises textile in sheetlike configuration, also called sheetlike textile above.

When print pastes according to the present invention are used for printing substrates, in particular textile, they provide spot or stainlessly printed substrates having excellent hand and good fastnesses, for example rubfastnesses.

The present invention further provides combinations of a plurality of, for example at least two print pastes according to the present invention which preferably each comprise a colorant of differing color. Present invention combinations of the present invention print pastes make it possible to produce multicolored prints for example. The present invention further provides a process for treating substrates, in particular textile, by using at least one aqueous binder-containing formulation according to the present invention, hereinafter also called inventive treating process. Details concerning the practice of embodiments of the inventive treating process are specified above.

The present invention further provides a process for printing substrates, in particular textile, by using at least one printing paste according to the present invention. The present invention's process for printing substrates is hereinafter also called inventive printing process.

Printing can be accomplished using conventional processes, for example a screen printing process.

One embodiment of the inventive printing process will now be described.

The inventive printing process proceeds from substrate which can be unpretreated or conventionally pretreated. For example, cotton substrates can be pretreated, in particular bleached.

This is followed by printing with inventive print paste, for example with the aid of a squeegee. Printing can be uniform or substrate can be printed with one or more patterns.

In one embodiment of the present invention, the actual printing of substrate with print paste according to the present invention is followed by a thermal treatment, in one or more treating steps. It is possible for example to dry thermally and/or fix thermally, preference being given to drying at temperatures in the range from 70 to 120° C. for a period in the range from 30 seconds to 30 minutes and/or fixing, if appropriate following the drying operation, at temperatures in the range from 140° C. to 200° C. for a period in the range from 30 seconds to 15 minutes. Duration and temperature of the thermal treatment are in each case conformed to the substrate to be printed. The temperatures specified above are in each case the temperatures of the heating medium, for example of the circulating air flow.

The thermal treatment may be followed by washing or ironing.

The printed substrates obtained exhibit particularly little by way of spots or stains or preferably no spots or stains, but have a pleasant hand and good fastnesses such as for example rubfastnesses, and likewise form part of the subject matter of the present invention. Printed substrates according to the present invention preferably comprise printed textile. Textiles according to the present invention are for example very useful in the apparel sector and as flags or pennants, also as decorative fabrics in the home textile sector or in the industrial textiles sector.

The present invention further provides a process for producing aqueous binder-containing formulations which are in accordance with the present invention, in particular print pastes which are in accordance with the present invention, this process also being referred to herein as inventive production process. The inventive production process is accomplished by mixing, in particular stirring of
at least one compound of the general formula I,
at least one binder,
if appropriate at least one colorant, preferably at least one pigment, for example in the form of a pigment preparation,
if appropriate with thickening agent and if appropriate with at least one addition and if appropriate bulking with water.

The order in which the aforementioned constituents of print pastes according to the present invention are added is freely choosable. When it is desired to use one or more thickening agents, it is preferable to add the thickening agent or agents last or immediately before the bulking with water.

The inventive production process can be carried out in any desired vessels, for example in stirred vessels.

When it is desired to use one or more thickening agents, it is preferable to mix by means of a high speed stirrer, for example an Ultra-Thurrax.

The invention is elucidated by working examples.

Preliminary remark: The following starting substances were used:
compound of formula I.1 was prepared from $C_{13}/C_{15}$ oxo process alcohol ($R^1$—OH), ethylene oxide, propylene oxide ($R^2$=methyl) and methanol ($R^3$=methyl). The remaining variables were as follows: x=3, y=1, a=1.

The comparative examples were each carried out using a softener comprising a 1:1 mixture of the cis/trans-isomeric diisononyl cyclohexane-1,4-dicarboxylates as V-W.2.

The following additions were used:
Emulsifier (Z.1):

(VI b.1)

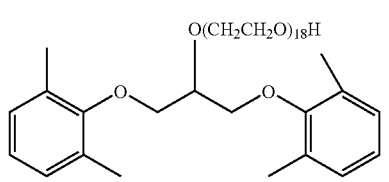

(Z.1)

O(CH$_2$CH$_2$O)$_{18}$H (Z.2): Carbodiimide based on meta-TMXDI having a titrimetrically determined NCO content of 6.7% by weight. This corresponds to about 4.2 carbodiimide groups/molecule.
Thickening agent (Z.3): Copolymer of acrylic acid (92% by weight), acrylamide (7.6% by weight), methylenebisacrylamide V.1 (0.4% by weight), quantitatively neutralized with ammonia (25% by weight in water), molecular weight $M_w$ about 150 000 g/mol, in a water-in-white oil emulsion, solids content 27%.
Binder (Z.4):
Copolymer dispersion of a random emulsion copolymer of 10 parts by weight of acrylic acid, 30 parts by weight of n-butyl acrylate, 60 parts by weight of styrene, solids content 40% by weight, pH 6.8.
Binder (Z.5):
Copolymer dispersion, pH 6.6, solids content 40% by weight, of a random emulsion copolymer of
1 part by weight of N-methylolacrylamide, 1 part by weight of acrylic acid, 4 parts by weight of acrylamide, 26 parts by weight of styrene, 68 parts by weight of n-butyl acrylate, parts by weight in relation to the binders are all based on total solids, average particle diameter (weight average) 172 nm, determined by Coulter Counter.

A pigment formulation was prepared as follows:
The following were milled together in a Drais Superflow DCP SF 12 stirred ball mill:
2640 g of Pigment Blue 15:3
460 g of an ethoxylation product of 1,2-diethylamine (molar ratio of ethylene oxide:1,2-diethylamine: 72:1)
600 g of glycerol
2300 g of distilled water
Milling was continued until the pigment particles had an average diameter of 100 nm to give pigment formulation (P.1).

I. Production of Inventive Print Pastes

The ingredients of Table 1 were stirred together in a stirred vessel, in the following order:

The initial charge was 200 ml of water and emulsifier (Z.1) was added. When the pH was below 8, a pH of 8.5 was set by addition of 25% aqueous ammonia. Then, (Z.2) and binder (Z.4) or (Z.5) as per Table 1 were subsequently added with stirring. Then, thickening agent (Z.3) and finally pigment formulation (P.1) were added with stirring. Bulking with water to one liter was followed by 15 minutes of stirring with an Ultra-Turrax type high speed stirrer at about 6000 revolutions/min.

This gave inventive print pastes DP.1 to DP.4 as per Table 1 and the corresponding comparative print pastes V-DP.5 and V-DP.6.

TABLE 1

| Composition of inventive and comparative print pastes | | | | | | |
|---|---|---|---|---|---|---|
| Ingredient [g] | DP.1 | DP.2 | DP.3 | DP.4 | V-DP.5 | V-DP.6 |
| (Z.1) | 5 | 5 | 5 | 5 | 5 | 5 |
| V-W.1 | — | — | — | — | 6 | 12 |
| Compound I.1 | 6 | 12 | 6 | 12 | — | — |
| (Z.2) | 4 | 4 | 4 | 4 | 4 | 4 |
| (Z.3) | 37 | 37 | 37 | 37 | 37 | 37 |
| (Z.4) | 100 | 100 | — | — | 100 | 100 |
| (Z.5) | — | — | 100 | 100 | — | — |
| (P.1) | 10 | 10 | 10 | 10 | 10 | 10 |
| Water | to 1 l | to 1 l | to 1 l | to 1 l | to 1 l | to 1 l |

All quantities reported for the ingredients are in g and are based on the respective solids, only the data for pigment formulation (P.1) are gross.

II. Printing of Textile

The substrate printed was a woven cotton fabric, bleached, unmercerized, areal weight 196 g/m$^2$.

Printing: 8 mm squeegee, magnetic pull level 6, E 55 screen gauze

Thermal treatment: 2 steps, step 1: drying: at 80° C. in drying cabinet. The subsequent 2nd step of the thermal treatment (crosslinking) was in each case carried out on a tenter with hot air by heating to 150° C. for five minutes.

This gave the inventive cotton substrates BW.1 to BW.4 and the comparative substrates V-BW.5 and V-BW.6, respectively. Application was in each case repeated more than once using fresh substrate. Two different drying cabinets were used for the comparative experiments on the one hand and for the inventive experiments on the other hand.

The inventive printed cotton substrates BW.1 to BW.4 were free of spots or stains, under the microscope (scale 1:75) and on inspection by naked eye, whereas comparative substrates V-BW.5 and V-BW.6 exhibited slight spotting or staining. The results of the other performance tests are shown in Table 2.

TABLE 2

Performance testing of inventive cotton substrates BW.1 to BW.4 and of comparative substrates V-BW.5 and V-BW.6

| Print paste | DP.1 | DP.2 | DP.3 | DP.4 | V-DP.5 | V-DP.6 |
| --- | --- | --- | --- | --- | --- | --- |
| Printed cotton | BW.1 | BW.2 | BW.3 | BW.4 | V-BW.5 | V-BW.6 |
| Rubfastness wet | 3-4 | 3-4 | 3-4 | 3-4 | 3-4 | 3-4 |
| Rubfastness dry | 4-5 | 4-5 | 4-5 | 4-5 | 4-5 | 4-5 |
| Hand | Very soft | Very soft | Very soft | Very soft | Soft | Soft |

Rubfastnesses (wet and dry) were each determined by DIN EN ISO 105-X12. Hand was in each case determined by panels of judges.

We claim:

1. An aqueous binder-containing formulation comprising: at least one compound of formula I

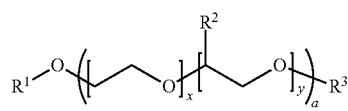

wherein:
- $R^1$ is selected from the group consisting of a straight chain $C_{10}$-$C_{18}$-alkyl and a branched $C_{10}$-$C_{18}$-alkyl,
- $R^2$ in each occurrence is the same or different and is a $C_1$-$C_3$-alkyl,
- $R^3$ is selected from the group consisting of a straight chain $C_1$-$C_8$-alkyl and a branched $C_1$-$C_8$-alkyl,
- x is from 3 to 20,
- y is from 1 to 20,
- a is from 1 to 3, and at least one pigment.

2. The aqueous binder-containing formulation according to claim 1, in the form of print pastes, coating compositions and dyeing liquors.

3. The aqueous binder-containing formulation according to claim 1, further comprising at least one binder selected from the group consisting of polyacrylates and polyurethanes.

4. The aqueous binder-containing formulation according to claim 1 which is free of alkyl esters of dicarboxylic acids.

5. A combination of at least two aqueous binder-containing formulations according to claim 1.

6. A process for treating a substrate, comprising applying at least one aqueous binder-containing formulation according to claim 2 to said substrate.

7. The process according to claim 6 wherein said substrate comprises a textile.

8. A substrate treated by the process according to claim 6.

9. A process for producing aqueous binder-containing formulations according to claim 1, comprising mixing at least one compound of formula I with water, at least one binder and at least one pigment.

10. A process for treating a substrate comprising applying at least two aqueous binder-containing formulations according to claim 5 to said substrate.

11. The process according to claim 10, wherein said substrate comprises textile.

12. A substrate treated by the process according to claim 10.

* * * * *